March 3, 1942. H. KOPPERS 2,275,399
PROCESS FOR THE REMOVAL OF PHENOL FROM GAS AND WEAK AMMONIA LIQUORS
Filed July 24, 1939
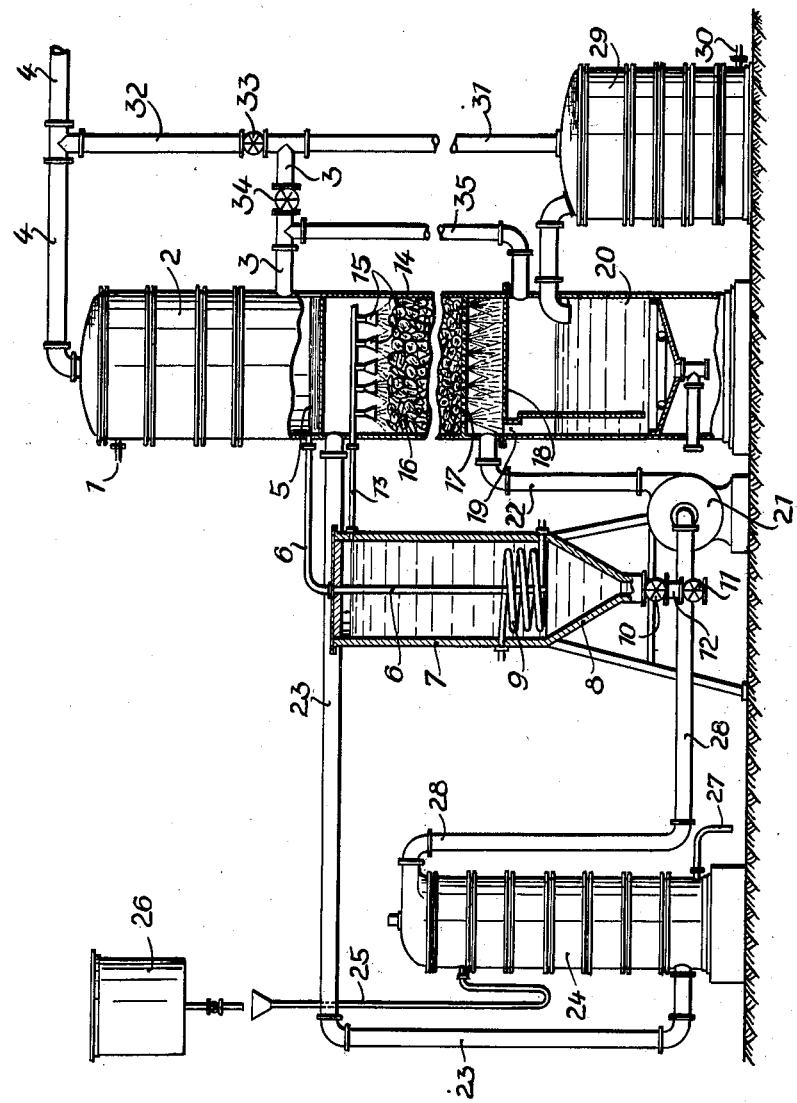
Inventor:
Heinrich Koppers
By Henry Loor Clarke
his Atty Patented Mar. 3, 1942

2,275,399

UNITED STATES PATENT OFFICE 2,275,399

PROCESS FOR THE REMOVAL OF PHENOL FROM GAS AND WEAK AMMONIA LIQUORS

Heinrich Koppers, Essen, Germany, assignor, by mesne assignments, to Koppers Company, Pittsburgh, Pa., a corporation of Delaware Application July 24, 1939, Serial No. 286,241
In Germany July 25, 1938

1 Claim. (Cl. 260—627)

The present invention relates to the dephenolization of gas liquor, produced in the distillation of bituminous fuel or other effluents, by means of steam, or other gaseous media, which is circulated through the gas liquor after the gas liquor has been freed from acid constituents such as hydrogen sulphide, carbon dioxide and the like, and freed from free ammonia, by means of heating. The gas liquor after being freed of phenol is then passed through an absorption apparatus charged with alkaline solution wherein the fixed ammonia is recovered from the liquor freed from phenols by means of distillation in the presence of the alkali, such as lime.

It is common practice when dephenolizing liquors or effluents to remove first of all the so-called acid constituents, such as hydrogen sulphide, carbon dioxide, cyanogen compounds and the like, and eventually the free ammonia contained in the liquor. This is done by heating up the phenol containing liquor to a temperature near the boiling point by passing steam through the liquor. In this way phenols are recovered in a subsequent step in a comparatively pure form.

In order to extract the phenols from the liquor, it is advantageous to use a current of steam in circulation. The steam is brought into contact with the phenol liquor, freed from ammonia and acid constituents, within a treating chamber filled with coke lumps or other suitable gas and liquid contact bodies. The filler of such bodies in the treating chamber distributes the liquor over a large surface so that the steam flowing through the chamber may easily carry forward the phenols.

The steam laden with phenols then flows through a column apparatus or the like, which is charged with soda lye, or another suitable alkaline absorbing medium for phenols. The phenols are thereby reduced to alkaline phenolates, the steam pressure of which is considerably lower than that of the free phenol, so that the steam in circulation leaves the absorption column in a state practically free from phenols Hence the steam may be used anew for the removal of phenols from phenol bearing liquor to be cleaned.

When carrying out the process as known heretofore and described in the foregoing, considerable difficulties were encountered in that serious deposits are formed in the treating chamber used for the removal of phenol, said deposits clogging up the intervening spaces between the filler bodies and render impossible a uniform distribution of the phenol containing liquor and of the steam, serving for the dephenolization, over the cross area of the treating chamber. Investigations about these difficulties have shown that the phenols contained in the phenol bearing liquors, such as low-temperature and weak ammonia liquor, or the like, have a tendency to polymerize more or less when they are heated to about 100 degrees centigrade and tend to form gum-like bodies which are highly molecular. If the phenol containing liquor, preheated to about 100 degrees centigrade, is then led over the filler bodies in the treating chamber used for the dephenolization process, the gums firmly adhere to the large surfaces of the filler bodies.

The invention, based upon these investigations, consists in keeping the hot phenol containing liquor, freed from acid constituents and possibly also from the free ammonia, within a settling tank for a given time at an increased temperature, before introducing same into the treating chamber.

According to the invention, the phenols which tend to form highly molecular gum-like bodies when being heated, are allowed to polymerize and deposit the gum-like bodies, before the phenol containing liquor reaches the treating chamber that is occupied with filler bodies for the removal of the phenols. The polymerized gum-like constituents may easily be removed from the settling tank, placed between the stage at which the acid impurities (and the free ammonia) are removed and the dephenolization step, especially if the liquor contained in the tank is kept at a suitably high temperature. By separating the polymerizing bodies from the phenol containing liquor, the working of the dephenolization stage itself is facilitated to a considerable extent. Since deposits and clogging-up are no longer to be feared, it is also possible to provide smaller filler bodies which afford a substantially larger surface area of contact within the treating chamber, thus enabling a reduction in the quantity and velocity of the steam which serves to remove the phenols, in an advantageous manner.

With the above and other objects and features of my present invention in view, I shall now describe a preferred embodiment thereof on the lines of the accompanying drawing which shows partly in side elevation and partly in vertical section, apparatus for the removal of phenols from weak ammonia liquor, according to my present invention.

The weak ammonia liquor to be treated flows through the pipe line 1 first of all into a column apparatus 2 which serves to heat-up the liquor by means of steam to the high temperature at which ammonia and acid constituents, such as carbon dioxide, hydrogen sulphide, cyanogen compounds, and the like, evaporate from the liquor, the phenols remaining, however, substantially in the weak ammonia liquor. Steam is added from below through the pipe line 3 into the column 2. The escaping constituents leave through the pipe line 4.

The hot weak ammonia liquor accumulates on the very bottom of the column apparatus 2 at point 5. It then flows through the pipe 6 into a settling tank 7 equipped with a heat insulating jacket, said tank 7 having a conical bottom 8. The settling tank 7 is, moreover, fitted with a heating device consisting of a pipe coil 9 in order to maintain the liquor contained in it at the desired temperature for polymerization. An outlet pipe 12 is provided for the conical bottom 8 and is governed by two shut-off valves 10 and 11. By an alternating opening and closing of the valves 10 and 11, the constituents accumulating in the bone bottom 8 may be discharged into the pipe 12 and thence into a suitable transporting vessel.

The settling tank 7 is connected by means of the pipe line 13 with the dephenolizing section 14 in such a manner that the hot liquor from the settling tank 7 may overflow continuously into the dephenolizing section 14. As may be seen from the drawing, the inlet pipe 6 reaches far down into the liquor in the settling tank 7.

The settling tank 7 is of such a size that the weak ammonia liquor flowing continuously through the said tank remains in a state of rest practically for a long period. The effect of this is that the gum-like constituents in the liquor, which has been heated-up in the column apparatus 2, and the gums being formed by the polymerization of certain phenols, will precipitate from the gas liquor, and the polymerization processes, which are carried on rather slowly, are completed in tank 7. The hot gas liquor flowing-off through the pipe line 13 is therefore practically completely freed from substances which have a great tendency to polymerize at the temperature of about 100 degrees centigrade involved in the process in question here.

From the pipe line 13, the gas liquor is distributed by a series of sprinklers 15 over the filler of bodies 16, for instance over lumpy coke, which is laid upon a grate-like intermediate bottom 17 in the section 14. The liquor flows in well distributed condition downwardly over the filler bodies 16, and collects on the bottom 18 of the section 14, from whence it passes through an opening 19 into the lime mixing tank 20 provided underneath the dephenolizing section 14.

Steam is introduced underneath the grate 17 of the section 14 by means of a fan 21 through the pipe line 22. The steam rises upwards through the filler mass 16 and thereby comes into close contact with the weak ammonia liquor containing phenols. The steam now absorbs the phenols from the gas liquor so that the steam laden with phenols escapes from the top of the section 14 through the pipe line 23.

The pipe line 23 leads to a phenol absorber 24 which is, for instance, designed similar to a column apparatus. Soda lye, or another suitable phenol absorbing medium, flows to the absorber 24 through the pipe line 25 from a storage tank 26. Instead of using the column apparatus, also an absorption vessel charged with metal turnings, or another suitable filler, may be adopted through which the gas can flow with a low pressure loss. The soda lye flows downwards in the column apparatus 24 and and thereby absorbs the phenols from the countercurrent steam passing through the column. The soda lye laden with phenols is finally discharged through the pipe line 27.

The steam which has transferred its phenols to the lye in absorber 24, is sucked through the pipe line 28 by means of the fan 21 and moved anew through the dephenolizing section 14.

The gas liquor freed from phenols is mixed with lime in the section 20. It then flows in the usual manner into the so-called lime column 29 into which steam is introduced from below through the pipe line 30.

The distilled ammonia and the steam leave the column 29 through the pipe line 31 which, by means of the pipe 32, controlled by a valve 33, is connected with the free-ammonia gas pipe line 4. On the other hand, the pipe line 31 is connected with the pipe line 3, controlled by the valve 34, said pipe 3 leading to the free-ammonia column 2. Finally, the pipe line 3 is coupled to the lime mixing section 20 by means of the pipe line 35.

By a suitable adjustment of the valves 33 and 34, a part of the steam withdrawing from the lime column 29 may be led into the free ammonia column 2 in order to heat the gas liquor to the necessary temperature without effecting the escape of the phenols already present in the column 2.

I have now above described my present invention on the lines of a preferred embodiment thereof, but my invention is not limited in all its aspects to the mode of carrying it out as described and shown, since the invention may be variously embodied within the scope of the following claim.

I claim:

In a process for the recovery of phenols from gas and weak ammonia liquors containing acid-gas constituents, which comprises the steps of freeing the liquor from the acid-gas constituents and from free-ammonia by a step of heating involving heating the liquor to about 100° C.; and the step of thereafter recovering phenol from the acid-gas and free-ammonia free liquor by the circulation of gaseous phenol-carrier media through the liquor in a separate phenol stripping stage to take up the phenol and thence through a phenol absorption stage to remove the phenol from its carrier by means of an alkaline phenol-absorption solution: the improvement comprising a reaction phase step in which the liquor is subjected, after it is freed from the acid-gas constituents and free-ammonia, but before it reaches the phenol stripping stage of the phenol recovery step to a quiescent reaction-phase settling action, while being heated, for a period of time to permit gums being formed by polymerization of phenols to complete their polymerization reaction and settle out of the liquor before the liquor passes on to the phenol stripping stage of the step for recovery of phenols from the liquor.

HEINRICH KOPPERS.